Oct. 17, 1961  M. C. A. QUENOT  3,004,346
STEEL TAPE FOR MEASURING INTERNAL DIMENSIONS
Filed Dec. 4, 1957

INVENTOR:
MICHEL CHARLES ANDRE QUENOT
BY
Richardson, David and Nardon
ATTY'S.

United States Patent Office 3,004,346
Patented Oct. 17, 1961

3,004,346
STEEL TAPE FOR MEASURING INTERNAL DIMENSIONS
Michel Charles André Quenot, Besancon, France, assignor to Société à Responsabilité Limitée dite: Etablissements Quenot & Cie, Besancon, France
Filed Dec. 4, 1957, Ser. No. 700,624
Claims priority, application France Dec. 20, 1956
2 Claims. (Cl. 33—138)

Instruments for measuring lengths are already known which comprise a case and a metal or steel tape formed with a scale on the front or upper side and coiled in the case, the tape end which represents the origin of the scale being adapted to be pulled out from the case through a slightly curved slot until the emerging portion of the tape thus stiffened has a length sufficient to permit the measurement of the dimension, which is effected by direct reading on the scale when the tape origin is coincident with one end of the length to be measured.

When an instrument of this type is used for measuring a dimension between two inner walls, the back side of the case is caused to abut against one of these walls, then the tape is pulled out from the case until its origin engages the other wall, and the reading is effected on the tape at the slot edge. This reading is not very accurate for only one side of the scale graduation is seen; in addition, the distance between the walls is obtained by adding to this initial reading the length of the case, so that the measurement is retarded, complicated, and becomes a source of errors.

Now, it is the essential object of the present invention to provide an instrument for measuring lengths, which is of the general type defined hereinabove but is remarkable in that it is free of the inconveniences characterizing prior devices of this type, since any internal dimension can be measured by direct reading.

To this end, the metal tape having its upper or front side graduated as already known for effecting conventional measurements carries in addition on its back face another scale for the direct reading of the measure representing the inner dimension.

The features and advantages of this invention will appear more clearly as the following description proceeds with reference to the accompanying drawing forming part of this specification and illustrating diagrammatically by way of example a typical embodiment of the invention. In the drawing.

Figure 1:
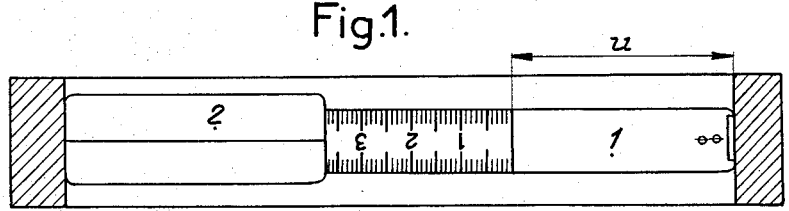
FIGURE 1 is a bottom plan view showing a steel tape as utilized for measuring an internal dimension.

The measuring instrument according to this invention, according to the embodiment illustrated by way of example in the drawing, consists of a steel tape which is both flexible and rigid, and has a curved cross-section, having a total length, for example of 39", 78" or the like.

Of course, any suitable material may be used for manufacturing the case in which the tape is coiled, for example metal, plastic or other materials, the same also applying to the tape proper; besides, any desired units of length may be used instead of the metric system which is illustrated by way of example in the typical embodiment shown in the drawing.

Figure 2:
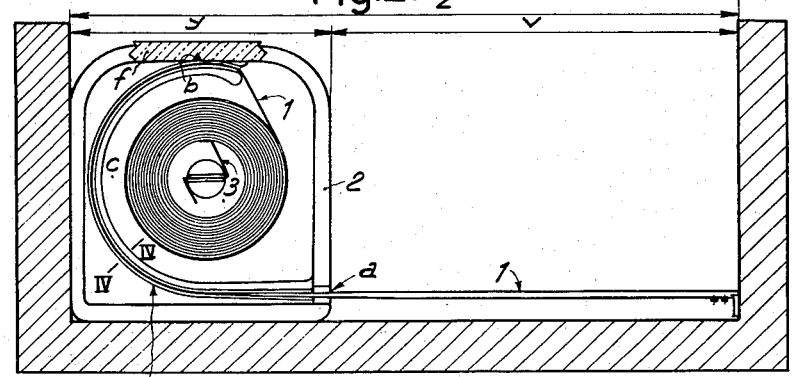
FIGURE 2 is an elevational view corresponding to FIG. 1 and showing the tape case with one side removed.

As shown in FIG. 2, the tape 1 is self-coiling in the case 2 by virtue of a spiral retractile spring 3 and carries on its front or upper face (see FIG. 3) a first scale the origin of which is coincident with the outer free end of the tape for making conventional length measurements in known manner.

Figure 3:
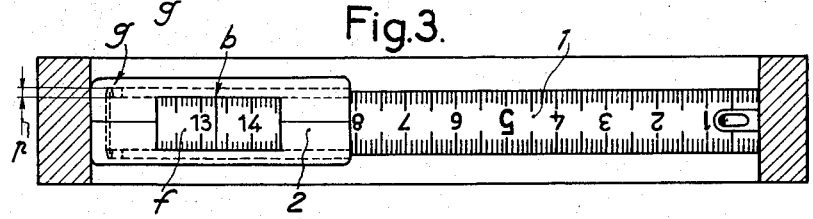
FIGURE 3 is a top plan view.
Figure 4:
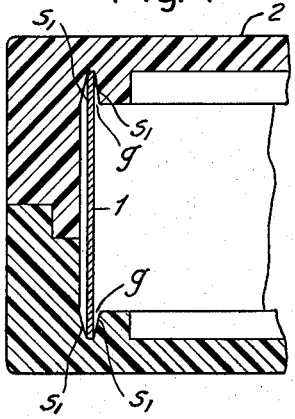
FIGURE 4 is an enlarged fragmentary sectional view taken on the line IV—IV of FIG. 2.

From the point $a$ where the tape emerges from the case 2 to a point $b$ marked by a transverse index line or the like on the upper or top face of the case and along the curved path $a$—$c$—$b$, the tape 1 is guided between two very narrow grooves $g$ in which the tape is adapted to slide without clearance. These confronting grooves $g$ have sloping sides $S_1$ which converge toward the bottom of each groove. The grooves $g$ thus engage the tape effectively without clearance and keep the length of the graduated tape 1 which lies between the points $a$ and $b$ at a perfectly constant value, irrespective of the amount of tape pulled out from the case. These grooves guide the tape only by its two edges. The back face of the tape also carries a graduated scale and when the tape is pulled out from the case it moves past the reference line $b$ as shown in FIG. 3 behind a transparent window $f$ provided in the top portion of the case 2. This window $f$ carries the transverse reference or index line $b$ in the form, for example, of a red line where the reading on the back face of the tape is effected.

The length of this window $f$ is at least twice the interval between two successive units of the scale so that the user may constantly see the two unit figures preceding and following the reference line $b$. In addition, the numbers on the back face are indicated in complete figures, that is, without omitting the tens and hundreds before the unit figures as in certain usual scales.

As shown in FIG. 3, each scale is upside down relative to the other scale, so that, if the numbers of one scale could be read by transparency through the other scale they would be seen upside down whereby the distance from said plane rear face to said free end of the said tape may be read on said second scale in conjunction with said reference mark and the distance from said free end to any point on said tape may be read on said first scale, said distance being read in both cases in the usual manner on scales graduated from left to right.

As in other steel tapes the scale origin on the upper side of the tape is coincident with the tape end. However, the scale origin of the second scale on the lower or back side of the tape is spaced from this free end, as shown in FIG. 1, by a distance $u=x-y$; where $x$ is the constant dimension of the tape between the points $a$ and $b$ along the curvilinear path $acb$, and $y$ is the length of the case 2.

The measurement of an inner length Z as shown in FIG. 2 is effected as follows:

The outer end of the tape 1 on the one side and the rear flat face of the case 2 on the other side are abutted against corresponding inner walls representing the length Z to be measured.

Through the transparent window $f$ and behind the reference line corresponding to the point $b$ the graduation line of the second scale on the back side of the tape is read which shows a value $l$ given by the equality:

$$l=v+x-u$$

As on the other hand, by definition $$u=x-y$$

this dimension may be written:

$$l=v+x-(x-y)=v+y=Z$$

which proves that the dimension $l$ read behind the reference line denoting the position of the point $b$ on the window $f$ is exactly the dimension Z to be measured.

Although only a preferred embodiment of the invention has been described and illustrated herein, it will be readily understood that various modifications may be

What I claim is:

1. An instrument for measuring lengths, comprising in combination a substantially rectangular case formed with a plane rear face and a front face spaced from said rear face and formed with a slot, the outer edge of said slot being spaced from said plane rear face by a predetermined fixed distance, and a metal tape coiled in said case, said tape being provided on its upper face with a first scale having its point of origin coincident with the outer free end of the tape, said tape being adapted to be moved longitudinally into and out of said case through said slot, a second scale carried by the lower face of said tape, the point of origin of said second scale being spaced inwardly from said free end of said tape, a transparent window in the top of said case, the length of said window being greater than the distance existing between two successive reference numbers of said scales, a reference mark on said window, guide means within said case, said guide means consisting of a pair of confronting narrow grooves extending along a curvilinear path, said grooves being formed in the inner side walls of said case, the edges of said tape being slidably engaged effectively without clearance in said grooves, said guide means engaging said tape and being adapted to keep said second scale in a reading position with respect to said reference mark, said guide means having the complementary function of maintaining a constant tape length between said slot and said reference mark, said constant tape length being greater than said predetermined distance, the spacing of the point of origin of said second scale from said free end being equal to the difference between said constant tape length and said predetermined distance, each scale being upside down relative to the other scale so that, if the numbers of one scale could be read by transparency through the other scale they would be seen upside down whereby the distance from said plane rear face to said free end of said tape may be read on said second scale in conjunction with said reference mark and the distance from said free end to any point on said tape may be read on said first scale, said distances being read in both cases in the usual manner on scales graduated from left to right.

2. An instrument as set forth in claim 1, wherein each of said grooves has two inclined edges converging to the bottom.

References Cited in the file of this patent

UNITED STATES PATENTS

| | | |
|---|---|---|
| 1,216,418 | Crogan | Feb. 20, 1917 |
| 1,494,740 | Forbes | May 20, 1924 |
| 1,926,581 | Clarke | Sept. 12, 1933 |
| 1,986,551 | Anderson | Jan. 1, 1935 |
| 2,132,202 | Carlson | Oct. 4, 1938 |
| 2,243,453 | Busse | May 27, 1941 |
| 2,347,273 | Lyle | Apr. 25, 1944 |
| 2,599,320 | Dart | June 3, 1952 |

FOREIGN PATENTS

| | | |
|---|---|---|
| 148,778 | Sweden | Feb. 8, 1955 |